Aug. 20, 1940.                H. A. HOWELL                2,212,192
                        ELECTROMAGNETIC APPARATUS
                          Filed Dec. 8, 1938
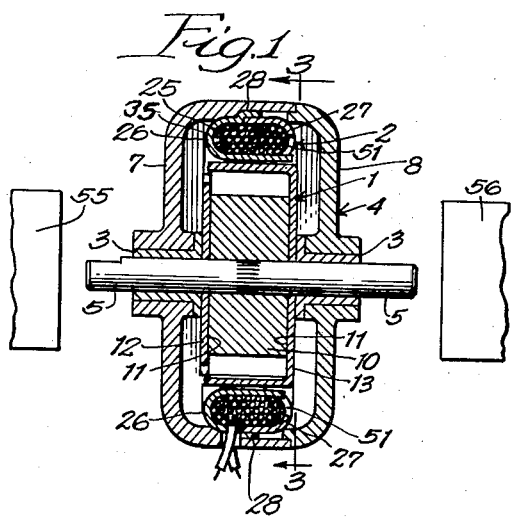
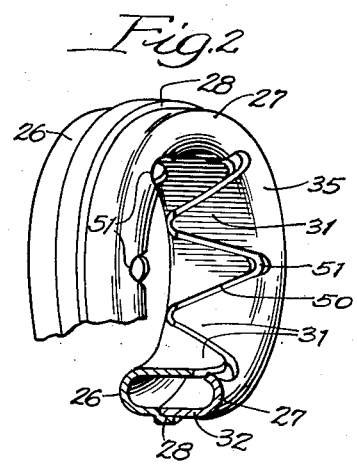
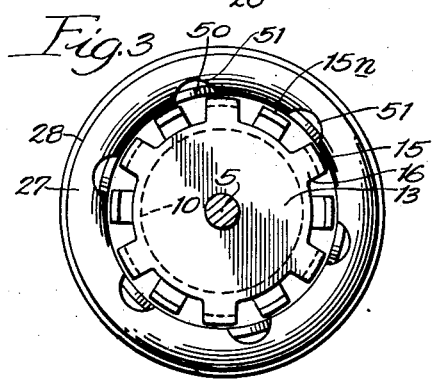
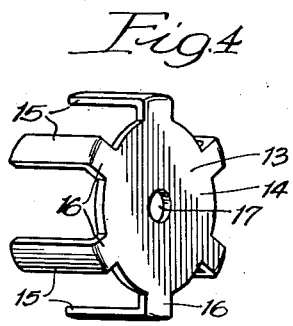
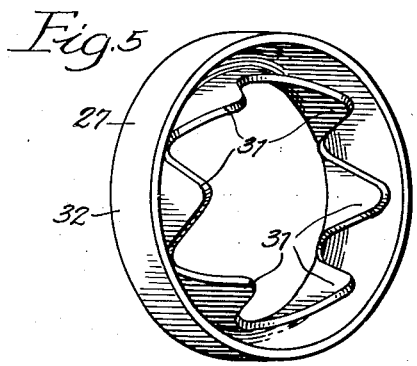
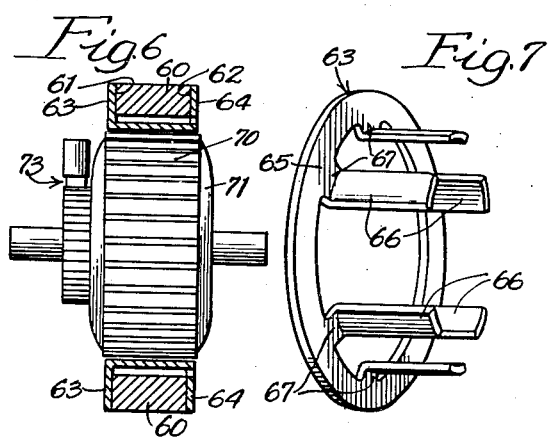
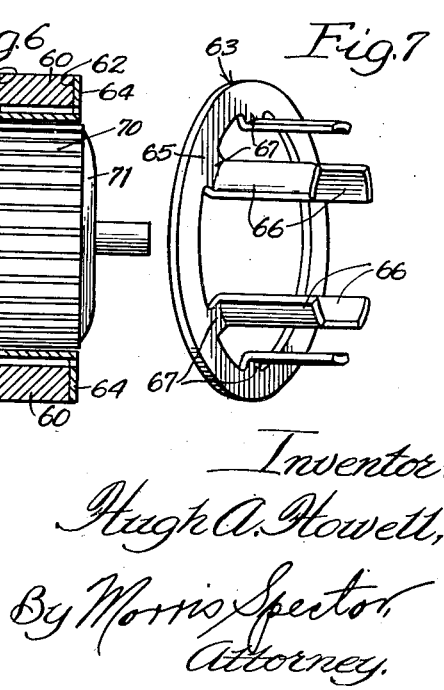
Inventor:
Hugh A. Howell,
By Morris Spector,
Attorney.

Patented Aug. 20, 1940

2,212,192

UNITED STATES PATENT OFFICE 2,212,192

ELECTROMAGNETIC APPARATUS

Hugh A. Howell, Berwyn, Ill., assignor to Frank Raffles, Chicago, Ill.

Application December 8, 1938, Serial No. 244,643

2 Claims. (Cl. 171—209)

This invention relates to permanent magnetic structures in general and more particularly to magnetic structures having a plurality of sets of poles. In its more specific aspects the invention is concerned with the construction of the field structure of a dynamo electric machine, such as an electric motor, or an electric generator, although the invention is not limited to the field structure of a dynamo electric machine.

It is one of the objects of the present invention to provide a permanent magnet having a plurality of sets of poles and which may be made cheaply and efficiently.

Consider an electric motor or generator the rotor of which comprises a permanent magnet devoid of any magnetizing winding. Such a machine is shown, for instance, in my Patent No. 2,131,436, issued September 27, 1938. It is comparatively easy to construct such a machine if the machine is to be bi-polar. However, in a machine having more than two poles there is considerable difficulty in magnetizing the rotor so that it will have the requisite number of poles. It is an object of the present invention to provide a rotor construction wherein this difficulty is obviated even though the rotor may have more than two poles.

If a permanent magnet alloy is permanently magnetized in a magnetic circuit including not more than a negligible air gap and is then removed from its magnetic circuit and immediately reinserted into the circuit, it is found that there is a substantial diminution in the magnetic strength. This is especially true in those arrangements wherein the permanent magnet is magnetized as fully as possible. In order to retain the maximum possible magnetic strength it is necessary that the permanent magnet structure shall not be removed from its magnetic circuit after it has been permanently magnetized. The permanent magnet must therefore be magnetized after assembly of the machine or magnetic circuit rather than before assembly. It is one of the objects of the present invention to provide a field structure for a dynamo electric machine having more than two poles and which is so constructed and arranged that the field may be permanently magnetized after assembly of the complete magnetic circuit of which the field is a part.

It is a further object of the present invention to provide a multi-polar field structure having a permanent magnet for furnishing the magneto motive force and wherein pole shoes in the form of simple stampings or the like may be provided for producing the requisite number of poles of the magnet, all of the poles receiving their magnetizing force from the permanent magnet. It is a still further object of this invention to provide such a structure wherein the permanent magnet is magnetized with all of its flux extending in the same direction.

The dynamo electric machine of the present invention can be used as a motor or as a generator wherever small amounts of power or electrical energy are necessary. By way of example, a few instances are herein given, namely, the generation of electricity for a toy wind or other operated power plant; a toy hand shocking machine or generator; an automobile wind operated generator for illuminating an ornament; a generator for the ignition system of an engine; a generator for supplying current to a flash light or bicycle lamp or for toy electric and mechanical trains; as a synchronous clock motor; as a small fan or phonograph motor; as a motor for operating small turn tables or the like. The above are but a few instances where electrical apparatus constructed in accordance with the teachings of the present invention may be useful.

The material of which the rotor is made comprises an alloy of iron, aluminum and nickel, with or without other metals optionally added. One preferred additional metal is cobalt, although any of the compositions described in the patents to Tokushichi Mishima, No. 2,027,994 to 2,028,000 may be used. Another preferred composition is that disclosed in the United States patent to Ruder, No. 1,968,569. If the compositions are such as referred to in the Mishima patents they should be suitably heat treated before magnetization, as described, for instance, in the United States patent to Ruder, No. 1,947,274. Permanent magnets of this type are sold under the trade name "Alnico" and contain 5 to 40% nickel, 7 to 20% aluminum, .05 to 30% cobalt and the remainder iron. If desired the magnet may be of a composition and made by the process disclosed in my pending application, Serial No. 180,824, filed December 20, 1937. A permanent magnet alloy such as above described is mechanically exceedingly hard and may be magnetized to form an exceedingly powerful permanent magnet. Because of its hardness the structure of the magnet should be as simple as possible to reduce casting difficulties. This further complicates the manufacture of permanent magnet castings having more than two poles.

While in the preferred construction the permanent magnet is spoken of as an alloy of iron, nickel, aluminum and another metal, it is not essential that this be the composition of that magnet. For instance, a permanent magnet structure may be made in the manner disclosed in the United States patent to Arey et al., No. 2,101,665, issued December 7, 1937. This magnet structure comprises finely powdered magnetite, ferric oxide and cobaltic oxide in the proportions of two molecules of magnetite, two molecules of ferric oxide and one molecule of cobaltic oxide, which have been molded under heat and pressure into a solid structure.

In one preferred embodiment of the present invention the permanent magnet comprises a cylindrical or tubular slug which is comparatively short and which is ultimately to be magnetized with the lines of force extending parallel to one another and parallel to the axis of symmetry of the cylinder. The ends of the cylinder are ground flat and parallel and end plates are fitted over the opposite ends of the cylinder. These end plates may be soft iron stampings each having a number of teeth projecting from the periphery thereof in a direction substantially axially of the cylindrical structure. The teeth of the two end plates alternate and are spaced apart so that adjacent teeth constitute opposite poles. This field structure may then be mounted in a stator structure having an armature winding and having soft iron poles. The distance between the poles of the stator and the poles or teeth of the rotor should preferably be less than half the distance between adjacent teeth of the rotor. In one preferred construction the distance between adjacent teeth of the rotor is approximately five times the distance between the rotor teeth and the stator poles. The rotor should be permanently magnetized after assembly in the stator. This may be accomplished by placing the structure in a magnetic field so arranged with respect to the structure that the lines of magnetic force extend parallel to the axis of rotation of the rotor, the field being of sufficient strength substantially to saturate the permanent magnet alloy The attainment of the above and further objects of the present invention will be apparent from the following specification taken in conjunction with the accompanying drawing forming a part thereof.

In the drawing:

Figure 1 is a longitudinal sectional view through a dynamo electric machine embodying the present invention;

Figure 2 is a perspective view of the magnetic portion of the stator of the machine of Figure 1;

Figure 3 is a sectional view taken along the line 3—3 of Figure 1 and looking in the direction of the arrows;

Figure 4 is a perspective view of one of the pole pieces or end plates of the rotor;

Figure 5 is a perspective view of one of the stator members before assembly;

Figure 6 is a diagrammatic view of a dynamo electric machine wherein the permanent magnet is the stator, rather than the rotor, and Figure 7 is a perspective view of one of the stator parts of the motor of Figure 6.

Reference may now be had more particularly to Figure 1. In this figure there is shown, for illustrative purposes, the present invention as applied to a twelve pole dynamo electric machine of the alternating current synchronous type which may be used as a motor or as a generator. The machine includes a rotor 1 and a stator 2, the rotor being journaled in suitable bearings 3 of a motor casing 4 which may be of any standard or conventional type. For this purpose the rotor is provided with a non-magnetic rotor shaft 5 journaled in the bearings 3. The casing may comprise two similar, preferably non-magnetic, housing members 7 and 8 in which the bearings 3 are mounted. The housing members 7 and 8 are preferably made of non-magnetic material to facilitate the magnetization of the rotor after assembly, as will be more fully set forth as this description proceeds.

The rotor 1 comprises a cylindrical slug 10 of permanent magnet material, the opposite faces 11—11 of which have been ground flat. The slug 10 may be made of any of the permanent magnet materials previously set forth. It preferably comprises a casting of a composition such as was previously described, although it may be a pressed and sintered molded article, as previously stated. A pair of identical end plates 12 and 13, each of a construction such as is illustrated more fully in Figure 4, are secured over the opposite faces 11—11 of the permanent magnet 10 centrally thereof. The end plates preferably comprise soft iron stampings. Each end plate includes a flat circular portion 14 from which project six teeth 15, each tooth being spaced from the portion 14 by a short radially extending arm or rib 16. Each tooth is to comprise one rotor pole in the assembled structure. The flat portion 14 is provided with a central opening 17 for receiving the rotor shaft 5. The surfaces of the end plates 12 and 13 that engage the surfaces 11 of the magnet 10 are smooth to assure good mechanical surface engagement between the end plates and the magnets. The end plates 12 and 13, the permanent magnet 10 and the shaft 5 are assembled to constitute the rotor. The teeth 15 of one end plate extend centrally in the spaces between adjacent teeth of the other end plate, as is illustrated in Figures 1 and 2. The rotor assembly is locked together in any desired manner.

An explanation will now be given of the construction of the stator of the machine. The stator comprises a continuous wire coil 25 of a large number of turns and of a generally doughnut shape, enclosed in two similar soft iron stampings 26 and 27 that form an overlapping press fit at 28. The stamping 27 may be made of a soft iron sheet metal ring. The center portion of the ring is stamped out to leave six triangular inwardly projecting teeth 31. Thereafter the teeth 31 are bent radially inwardly to form a true cylindrical surface, and the outer periphery 32 is bent radially to form a circumscribing cylinder of a length slightly more than half of the length of the cylinder formed by the inwardly projecting triangular teeth 31.

In the construction of the machine illustrated in Figure 1 the air gap between the rotor and the stator is made as small as possible. It should be less than half of the distance between adjacent teeth of the rotor, that is, less than half of the distance between a tooth 15 on one end plate and the adjacent tooth 15 of the opposite end plate. In the construction herein illustrated the distance between the rotor and the stator is approximately one-fifth of the distance between adjacent rotor teeth. The bend in the teeth 31 of the two opposite stator parts form a continuous saw tooth or sine shaped groove 50 around the inner periphery of the stator. The width of this groove is preferably at least two times the distance between the rotor and the stator, and should be substantially in excess of twice this distance if possible. It is to be noted that this groove 50 extends a short distance over the end faces of the stator, as is illustrated at 51 in Figure 1.

The assembled stator may be press fitted or otherwise secured within the stator frame 7 and the entire unit then enclosed by the stator frame 8. After assembly of the machine the permanent magnet 10 is permanently magnetized. This is accomplished by placing the machine in a strong electromagnetic field, the lines of force of which extend substantially axially of the machine. The field is preferably as strong as possible so that the flux density thus created in the permanent magnet 10 approaches the saturation of the material. The means for creating this field is indicated diagrammatically at 55—56, which may comprise the opposite poles of a large direct current energized electromagnet. After the rotor 10 has thus been magnetized, the machine is removed from the field 55—56 and may then be ready for use. The structure 10 being a permanent magnet alloy retains the magnetism thus imparted thereto, whereas the rest of the metal structure of the motor does not thus become permanently magnetized. The magnet 10 may thus be magnetized to a strength approximating or even exceeding 7,500 gausses, and a maximum B H product or energy product over 1,000,000.

If desired the magnetizing poles 55—56 may be replaced by a direct current energized magnetizing coil outside of and surrounding the periphery of the stator, the axis of symmetry of the coil being coincident with the axis of the rotor shaft 5.

In magnetizing the structure one of the poles 55—56 is a north pole and one of the poles is a south pole so that the lines of magnetizing force extend through the permanent magnet 10 axially of the machine. As a result one face 11 of the permanent magnet 10 will be permanently a north magnetic pole and the opposite face 11 will be a south magnetic pole. Assume that the face engaged by the end plate 12 is a north pole and that the face engaged by the end plate 13 is a south pole. As a result all of the teeth of the end plate 12 will be north poles. These teeth have been indicated in Figure 3 by the reference numeral 15n. All of the teeth 15 of the end plate 13 will be south poles. Flux will extend from the permanent magnet, through the end plate 12, where it divides into six even paths, one for each tooth. The flux passes from each rotor tooth 15n, through the gap between the rotor and the stator, to the point opposite the adjacent rotor tooth 15 of the opposite end plate 13, which tooth is a south pole, and thence through that end plate back to the permanent magnet. The teeth 31 of the stator structure are so very close to the teeth 15 and 15n of the rotor that the iron comprising the end plates 12—13 and its teeth, together with the stator structure constitute a keeper for the permanent magnet 10. As a result there is very little tendency for the permanent magnet to become demagnetized. This is particularly true in view of the fact that the rotor is magnetized after assembly in the structure. Therefore at no time is the rotor removed from the iron structure that constitutes its keeper. The permanent magnet 10 retains its magnetization to a very high degree over long periods of time.

It is to be noted that while the teeth on the stator have been made in zigzag or sine shape, this is not an indispensable part of the present invention. The teeth of the stator may be rectangular as are the teeth of the rotor. Likewise, if desired, the teeth of the rotor may be triangular in shape so that the air gap between the teeth of the end plates 12 and 13 is of a sine shape rather than the shape illustrated. The sine shaped air gap in either the stator or rotor structure may be used with a similar or differently shaped air gap in the opposite structure.

If the coil 36 is energized by an alternating current and the rotor is started and brought up to a speed approximating synchronous speed, it will continue to operate as a synchronous motor. Conversely, if the rotor is mechanically rotated there will be generated an alternating E. M. F. in the coil 28, of a frequency depending upon the speed of rotation of the machine.

If desired the space 50 between adjacent teeth of the stator and the corresponding spaces between adjacent teeth of the rotor may be filled with any non-magnetic material, to thereby reduce windage losses.

Reference may now be had more particularly to Figures 6 and 7 wherein I show the principles of the present invention as applied to a dynamo electric machine wherein the field is the stator and the armature is the rotor. This machine may be a dynamo or a motor and it may be a direct current machine or an alternating current machine, depending upon the structure of the rotor. In this construction the stator or field structure comprises a solid ring 60 which corresponds structurally and functionally to the ring 10 of the motor of Figure 1 and which is formed of a permanent magnet material as previously set forth in this specification. The end faces 61 and 62 of the ring 60 are ground perfectly flat and parallel, and thereafter two identical end plates 63 and 64 are secured over the opposite faces of the permanent magnet. They may be secured in place in any desired manner, as by non-magnetic bolts and nuts, extending between the end plates through cored holes in the casting 60 or entirely outside of the outer periphery of the casting 60. Each end plate 63 is of a construction such as is shown more particularly in Figure 7 and comprises a soft iron stamping including a ring portion 65 from the inner periphery of which extend six rectangular teeth 66 uniformly spaced apart, the teeth projecting inwardly of the inner periphery of the ring 65 by an amount 67 in order to eliminate or reduce leakage between the teeth and the permanent magnet casting 60. The two end plates 63—64 are assembled with the teeth of the end plate 64 extending centrally between adjacent teeth of the plate 63 and the inner periphery of the teeth of the two end plates forming a cylindrical surface. The air gaps between adjacent teeth of the assembly, namely, between a tooth 66 of the end plate 63 and adjacent teeth 66 of the end plate 64 are at least twice and preferably five times as great as the distance between the teeth and the rotor structure 70. The rotor structure includes the usual soft iron rotor having slots in which are embedded armature coils 71. These coils receive current through a brush and ring arrangement 73. In the case of a direct current machine the brush and ring arrangement comprises a commutator and commutator brushes, the armature being wound for a twelve pole direct current machine. In the case of a synchronous machine the brush arrangement 73 comprises the usual slip rings and brushes for establishing current connections through the slip rings to the coils 71, the coils being wound for a twelve pole synchronous machine.

The permanent magnet ring 60 of the machine of Figure 6 is permanently magnetized after assembly of the rotor and stator structure within a frame, as in the case of the machine of Figure 1, so that the end plates 63—64 and their teeth, and the iron structure of the armature or rotor constitute a keeper for the permanent magnet 60, thereby allowing for permanent magnetization of the permanent magnet 60 to a very high degree, as previously pointed out.

The slots in the rotor 70 for receiving the winding 71 may be of any desired shape known in the art. The teeth 66 of the end plates 63—64 are preferably rectangular, as illustrated in Figure 7. It is, however, to be understood that the invention is not limited to the use of rectangular teeth as they may well be of triangular shape with the bases of the triangles of the end plate 63 adjacent the ring 65 and their apices remote from the ring 65 so as to produce a saw tooth or sine shaped air gap corresponding to the air gap 50 of Figure 2.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A dynamo electric machine having a stator structure comprising a ring shaped coil winding and means forming magnetic circuits embracing the ring and including spaced teeth along the inner periphery of the ring constituting pole pieces, and a rotor structure journaled for rotation within the stator, said rotor structure comprising a permanent magnet magnetized so that the magnetic lines of flux extend therethrough substantially axially of the rotor, and magnetic members at opposite ends of the rotor and each having circumferentially spaced teeth extending outwardly radially and then bent towards the teeth of the other member and of a length to terminate over the opposite end of the magnet and constituting pole pieces, the teeth of the two members intermeshing but spaced apart an amount in excess of the space between the rotor teeth and the stator teeth, the number of teeth on the rotor being the same as the number of teeth on the stator, and the teeth on one of the structures being at a substantial angle to the magnetic gaps between adjacent teeth on the other structure with at least a part of each rotor tooth opposite at least a part of a stator tooth for every position of the rotor.

2. A dynamo electric machine having a stator structure comprising a ring shaped coil winding and two circular magnetic sheet metal stampings enclosing the winding, said stampings covering the outer periphery of the coil, the stampings having intermeshing spaced-apart teeth on the inner periphery of the coil with a magnetic gap between adjacent teeth on the inner periphery of the coil and with the stampings forming continuous magnetic circuits extending from each tooth around the coil to an adjacent tooth, a windingless permanent magnet rotor structure journaled for rotation within the stator structure, said rotor comprising a permanent magnet magnetized so that the magnetic lines of flux extend therethrough substantially axially of the rotor, sheet metal magnetic stampings at opposite ends of the magnet and abutting thereagainst and constituting a part of the rotor structure, each rotor stamping having a plurality of teeth projecting therefrom towards the other rotor stamping and with the teeth of each rotor stamping uniformly spaced about the axis of rotation of the rotor, the teeth of the two rotor stampings intermeshing but spaced apart an amount in excess of the spacing between the rotor teeth and the stator teeth, the number of teeth on the rotor being the same as the number of teeth on the stator, the spacings which constitute the magnetic gaps between adjacent teeth on one of said structures being at a substantial angle to the spacings between adjacent teeth on the other structure so that at least a part of each rotor tooth is opposite at least a part of a stator tooth for every position of the rotor, the axial length of the rotor teeth being substantially equal to the thickness of the stator in a direction axially of the machine.

HUGH A. HOWELL.